(12) United States Patent
Mangold et al.

(10) Patent No.: US 7,453,857 B2
(45) Date of Patent: Nov. 18, 2008

(54) MEASURING MEDIUM ACTIVITY PATTERNS IN WIRELESS NETWORKS AND DERIVING INFORMATION FROM THE ACTIVITY PATTERNS

(75) Inventors: Stefan Mangold, Ossining, NY (US); Zhun Zhong, Croton-on-Hudson, NY (US); Amjad Soomro, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 422 days.

(21) Appl. No.: 10/556,011

(22) PCT Filed: May 3, 2004

(86) PCT No.: PCT/IB2004/001506
§ 371 (c)(1),
(2), (4) Date: Nov. 8, 2005

(87) PCT Pub. No.: WO2004/100468
PCT Pub. Date: Nov. 18, 2004

(65) Prior Publication Data
US 2007/0002890 A1    Jan. 4, 2007

Related U.S. Application Data

(60) Provisional application No. 60/503,850, filed on Sep. 17, 2003, provisional application No. 60/469,196, filed on May 9, 2003.

(51) Int. Cl.
*H04Q 7/24* (2006.01)
*H04L 12/43* (2006.01)

(52) U.S. Cl. .................................... 370/338; 370/459

(58) Field of Classification Search ................ 370/338, 370/459
See application file for complete search history.

(56) References Cited

U.S. PATENT DOCUMENTS

| 2002/0160769 | A1 | 10/2002 | Gray |
| 2004/0068668 | A1* | 4/2004 | Lor et al. .................... 713/201 |
| 2004/0156336 | A1* | 8/2004 | McFarland et al. ......... 370/329 |

(Continued)

FOREIGN PATENT DOCUMENTS

EP    1 282 257 A1    2/2003

OTHER PUBLICATIONS

"RFC 2041—Mobile Network Tracing" by Brian D. Noble, Oct. 1996, pp. 1-21.

(Continued)

*Primary Examiner*—Andrew Lee
(74) *Attorney, Agent, or Firm*—Larry Liberchuk

(57) ABSTRACT

An apparatus and method is provided for measuring medium activity patterns in wireless networks and deriving information about the radio environment from the measured medium activity/patterns. This invention is three-fold. First, it defines what to measure, including medium idle/busy patterns based on power detection, medium idle/busy pattern based on preamble detection, and medium idle/busy pattern based on virtual sensing. Second, it provides a mechanism for communicating the measurement request and report, as illustration for the case of IEE 802.11. And last, it defines the information that can be derived given these measurements as discovery of: non-802 devices, 802.11e systems, 802.11e contention-based medium access priorities, 802.11e controlled medium access usage, 802.11b/g existence, and hidden stations.

12 Claims, 9 Drawing Sheets

U.S. PATENT DOCUMENTS

2004/0203727 A1* 10/2004 Abiri et al. .................. 455/423
2004/0209634 A1* 10/2004 Hrastar ....................... 455/515
2005/0094620 A1*  5/2005 Calcev ........................ 370/351
2005/0154933 A1*  7/2005 Hsu et al. ................... 713/320
2006/0212510 A1*  9/2006 Nielsen ....................... 709/203

OTHER PUBLICATIONS

InfoTech—Wireless LAN Network Management White Paper, pp. 1-26, Apr. 2001.
"Layer 2 Analysis of WLAN Discovery Applications for Intrusion Detection", by Joshua Wright, pp. 1-13, Nov. 8, 2002.

* cited by examiner

|  |  |  |  |
|---|---|---|---|
|  |  |  |  |
|  | (5.15-5.25) | 36<br>40<br>44<br>48 | 5180<br>5200<br>5220<br>5240 |
|  | (5.25-5.35) | 52<br>56<br>60<br>64 | 5260<br>5280<br>5300<br>5320 |
|  | (5.725-5.825) | 149<br>153<br>157<br>161 | 5745<br>5765<br>5785<br>5805 |

FIG. 3C

|  |  |
|---|---|
| 2.4 GHz | 0 |
| 5 GHz | 1 |
|  | 2-255 |

309 brackets the 2.4 GHz and 5 GHz rows.

FIG. 3D

| | 0 | 1 | 2 | 3 | 4-255 |
|---|---|---|---|---|---|
| | | $(i_0+[i*\Delta i...(i+1)*\Delta i])$ | $(i_0+[i*\Delta i...(i+1)*\Delta i])$ | $(i_0+[i*\Delta i...(i+1)*\Delta i])$ | $(i_0+[i*\Delta i...(i+1)*\Delta i])$ |

420 (braces under columns 1-4-255)

FIG. 4C

| | |
|---|---|
| 0 | -87 |
| 1 | -82 |
| 2 | -77 |
| 3 | -72 |
| 4 | -67 |
| 5 | -62 |
| 6 | -57 |
| 7-255 | |

421 { (rows 0 through 7-255)

FIG. 4D

MEASURING MEDIUM ACTIVITY PATTERNS IN WIRELESS NETWORKS AND DERIVING INFORMATION FROM THE ACTIVITY PATTERNS

CROSS REFERENCE TO RELATED APPLICATION

This application claims the benefit of U.S. provisional application Ser. No. 60/469,196 filed May 9, 2003 and U.S. provisional application Ser. No. 60/503,850 filed Sep. 17, 2003, both of which are incorporated herein in whole by reference.

The present invention relates to measuring medium activity in wireless networks and deriving information about the radio environment from the measure medium activity.

In a wireless communication environment many systems share the medium and information about their use of the medium is necessary to facilitate radio resource management. Since the medium is shared, it is possible for anyone to monitor transmissions, collect and analyze data about transmissions in order to characterize use of the medium.

However, it is normally not possible to query other users of the medium directly about their use of the medium and therefore this data must be collected indirectly by sensing the traffic on the medium and collecting data from this traffic to derive the activities being performed and the patterns associated with these activities.

As wireless local area network WLAN applications proliferate, tools are evolving for indirectly collecting such data, analyzing it and characterizing wireless network activities. These include such tools as wireless protocol analyzers that can observe each of the layers of the stack to reveal problems.

Concomitant with tool development, wireless network standards are evolving to keep up with demand for wireless network services. The IEEE standard for WLANs is 802.11 [1]. It uses different physical layers, for example 802.11a [2], and 802.11b [3] each of which documents are included by reference as if fully set forth herein. The original IEEE 802.11 standard for WLANs provided low data throughput and IEEE 802.11b was promulgated in 1999 to support basic data rates up to 11 Mbit/s (Mbps).

The majority of WLANs deployed today use 802.11b technology, which operates in the 2.4 GHz band and supports a maximum theoretical data rate of 11 Mbps, with an average throughput in the range of 4-6 Mbps. Minimizing interference is a challenge because of the many different radio systems operating already in the 2.4 GHz band.

However, recognizing that video and intensive multimedia applications needed higher data rates, the IEEE adopted the 802.11a standard that operates in the 5 GHz band and specifies methods to be used for data rates of up to 54Mbps but realistically achieves throughput in the range of 20-25 Mbps. Depending on the country, 802.11a has four, eight, or more channels. 802.11e provides Quality of Service (QoS) support for WLAN applications for which a guaranteed quality is critical, e.g., delay sensitive applications such as Voice over Wireless IP (VoWIP). Classes of service provide managed levels of QoS for data, voice and video applications. 802.11g offers data rates in the range of 6-54 Mbps, three non-overlapping channels, backward compatibility with 802.11b with attendant slow down to 802.11b speeds, and a variety of modulation techniques.

Many non-802.11 devices use the medium, e.g., Bluetooth devices, 2.4 GHz cordless phones and even microwave ovens are sources of interference and thus often create poor performance for 802.11 networks.

The present invention is an apparatus and method in which sensing results of busy and idle periods in a wireless medium are used to derive patterns of use about other radio systems that operate on the scanned medium. In a preferred embodiment, a radio device senses a wireless medium (this process is here referred to as sensing) to support the collection of information about activities of other radio devices using the medium (here referred to as measuring). Other radio devices may or may not comply with the same communication standard as the radio device and may or may not be part of the same network as the radio device.

In a preferred embodiment, the sensing radio device senses the wireless medium over some time (hereinafter referred to as sensing interval) and observes patterns of busy and/or idle periods, and/or patterns of protocol related points in time. The resulting patterns are hereinafter referred to as sensing results.

The following information can be derived from the sensing results, subject to missed and failed detection (therefore hereinafter referred to as discovery rather than detection).

Discovery of Non-802.11 Devices

Discovery of 802.11e Radio Systems by Measuring the Medium Idle Statistics

Discovery of 802.11e Radio Systems by Measuring the Behavior at Target Beacon Transmission Time(TBTT) and/or at Transmission Opportunity Limit (TXOPlimit). One crucial feature of the 802.11e MAC is the Transmission Opportunity (TXOP). A TXOP is defined as an interval of time when a station has the right to initiate transmissions, defined by a starting time and a maximum duration. TXOPs are acquired via contention (EDCF-TXOP) or granted by the HC via polling (polled-TXOP). The duration of an EDCF TXOP is limited by a QBSS-wide TXOPlimit distributed by the HC in beacon frames.

Discovery of Priorities in Contention-based Medium Access

Discovery of 802.11 medium access with highest priority, without random backoff

Discovery of 802.11b /802.11g Radio Systems

Discovery of Hidden Stations

The present invention advances the state of the art for WLANs by providing an apparatus and method for deriving information about radio system types and behaviors from their activity patterns, without communicating with these radio systems.

FIG. 3C illustrates Channel Number definitions for radio measurement requests;

FIG. 3D illustrates Channel Band definitions for radio measurement requests;

FIG. 4C illustrates Medium Sensing Event definitions for radio measurement reports; and FIG. 4D illustrates RPI Threshold Definitions for radio measurement reports of an RPI Time Histogram.

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments that depart from these specific details.

Figure 1A:
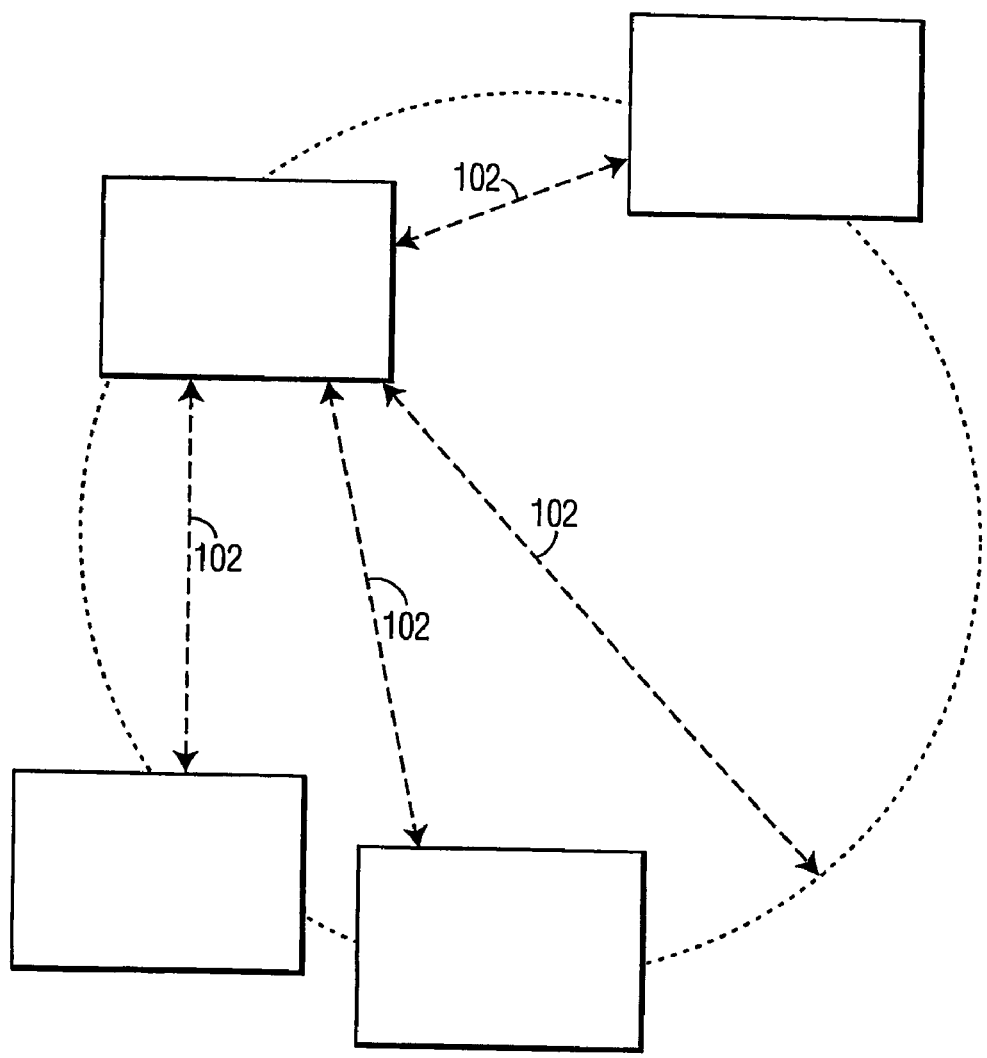
FIG. 1A is a simplified block diagram illustrating the architecture of a basic service set (BSS) wireless communication system whereto embodiments of the present invention are to be applied.
Figure 1B:
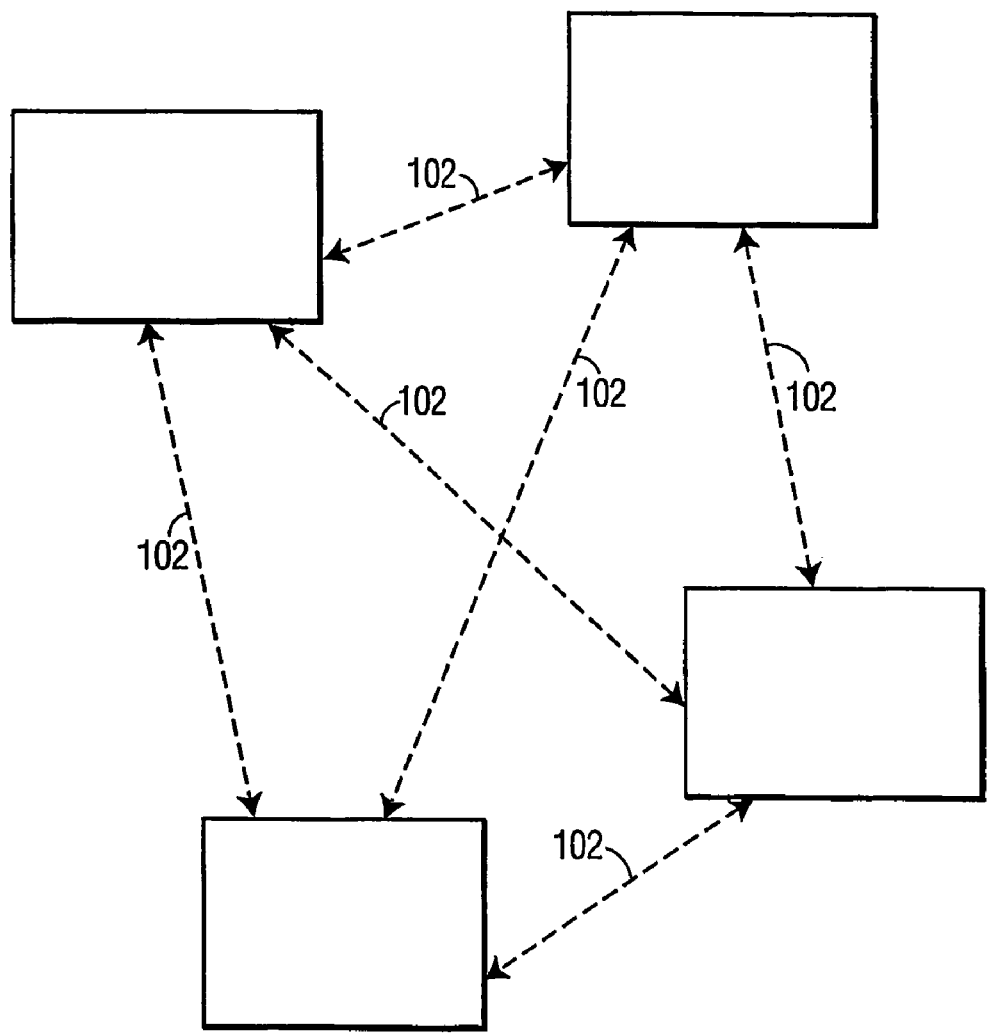
FIG. 1B is a simplified block diagram illustrating the architecture of an ad hoc-type Independent Basic Service Set (IBSS) wireless communication system whereto embodiments of the present invention are to be applied.

FIG. 1A is a representative basic service set (BSS) wireless network whereto embodiments of the present invention are to be applied. As shown in FIG. 1A, an Access Point (AP) 100 is coupled to a plurality of mobile Stations (STA$_i$) 101, which, through wireless links 102 are communicating with each other and the AP. A key principle of the present invention is to provide a mechanism to request and report histograms of a given precision so that medium activities of users can be derived therefrom by any of the AP 100 and STA$_i$ 101. FIG. 1B is a representative Independent Basic Service Set (IBSS) wireless network whereto embodiments of the present invention are to be applied. As shown in FIG. 1B, a plurality of mobile stations (STA$_i$) 101 communicate with each other through wireless links 102 without any AP. It should be noted that each network shown in FIGS. 1A-B is small for purposes of illustration. In practice most networks may include a much larger number of mobile STA$_i$ 101.

Figure 2:
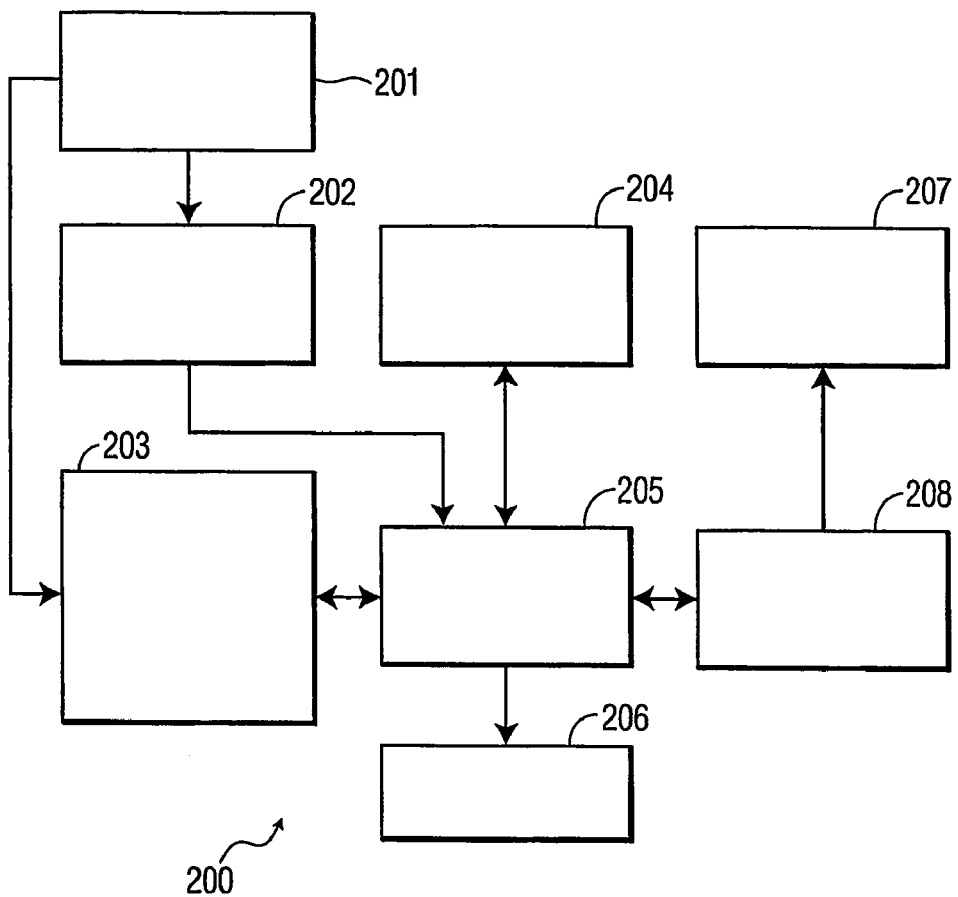
FIG. 2 illustrates a simplified block diagram of an Access Point (AP) and each Station (STA) within a particular Basic Service Set (BSS) or IBSS according to an embodiment of the present invention.

Referring to FIG. 2, the AP 100 and each STA$_i$ within the WLAN of FIGS. 1A and B may include a system with an architecture that is illustrated in the block diagram of FIG. 2. Both the AP 100 and each STA$_i$ 101 may include a receiver 201, a demodulator 202, an activity acquisition and pattern derivation circuit 203, a memory 204, a control processor 205, a timer 206, a modulator 207, and a transmitter 208. The exemplary system 200 of FIG. 2 is for descriptive purposes only. Although the description may refer to terms commonly used in describing particular mobile stations, the description and concepts equally apply to other processing systems, including systems having architectures dissimilar to that shown in FIG. 2.

In a preferred embodiment, the receiver 201 and the transmitter 208 are coupled to an antenna (not shown) to convert received histogram reports and transmit desired histogram requests and derived sensing results into corresponding digital data via the demodulator 202 and the modulator 207, respectively. The activity pattern acquisition circuit operates under the control of the processor 205 to the process received measurement report frames comprising measurements and corresponding time stamps or to make requested or periodic measurements (autonomously) in which measurements are conveyed along with corresponding time stamps in measurement report frames. FIG. 1B shows possible requestor and measurer combinations for both IBSS and BSS IEEE 802.11 WLANs embodiments of the present invention. The timer 206 is used to set the time stamp in the measurement report frames that indicates the start time of the measurement being reported.

In a preferred embodiment, as part of scanning the wireless medium, a radio device detects busy periods during which the accumulated received power level of radio signals exceeds a power threshold, with at least one of pure power detection and preamble detection.

Further, the radio device detects idle periods during which the accumulated received power level of radio signals is at least one of below a power threshold, and no preamble is detected.

It depends on the applied power threshold whether the medium is sensed as busy or idle. In an alternative embodiment, the radio device may apply multiple thresholds and different patterns are collected simultaneously during the sensing interval (time period) or successively during consecutive sensing intervals (time periods).

In addition, in an alternative embodiment, busy periods are defined as periods during which other radio devices allocate the medium but do not use the medium for transmission (here referred to as "virtual busy periods"). In this embodiment, even if the accumulated received power level of radio signals is below a power threshold, the medium may be sensed as being busy.

Sensing results are represented by histograms over time, and/or percentages per duration, and/or absolute numbers per duration and/or the complete sensing pattern and/or parts of the sensing pattern. A measuring STA listens to the channel and creates a histogram representing how long the channel is busy. At the completion of measurements, the listening STA know the probabilities (here called percentages) of durations of busy/idle periods. For example a measuring STA senses for one minute (sensing interval=60s) and determines by sensing that the channel is busy for a DURATION<100 ms in X1% of the time, for a 100 ms<DURATION<200 ms in X2% of the time, and for a 200 ms<DURATION<300 ms in X3% of the time. The STA either uses this information itself and does not report back or the STA then reports back the three values (also termed densities, or probabilities, or percentages) X1, X2, X3, or both Thus, in a preferred embodiment, the sensing results comprise or are derived from at least one or more busy and idle patterns obtained with at least one of a power threshold, preamble detection, and virtual busy period pattern.

The sensing results contain information about the channel activities of other radio devices. The actual measurement, i.e. the collection of information about channel activities by interpretation of the pattern of busy and idle periods, is performed by at least one of the sensing radio devices which, in a preferred embodiment, is configured as illustrated in FIG. 2 and possibly by at least another similarly configured device to which the sensing results are communicated. It is possible that a measuring STA uses the sensing results directly and does not communicate its sensing results.

Different types of sensing results can result after sensing the medium:

1. At least one sensed medium idle pattern based on power detection, for at least one power threshold;
2. At least one sensed medium busy pattern based on power detection, for at least one power threshold;
3. One sensed medium idle pattern based on preamble detection;
4. One sensed medium busy pattern based on preamble detection
5. One sensed medium idle pattern based on virtual busy periods;

6. One sensed medium busy pattern based on virtual busy periods;
7. One sensed medium pattern with at least one protocol related point in time, the protocol related points selected from the group consisting of the Target Beacon Transmission Time (TBTT) and contention-free intervals; and
8. Any combination of the patterns described in 1-7.

In a preferred embodiment, the sensing results of busy and idle periods in a wireless medium are used to derive information about other radio systems that operate on the scanned medium. The following information can be derived from the patterns, subject to missed and failed detection (therefore hereinafter referred to as discovery rather than detection).

Discovery of non-802.11 Devices

In a preferred embodiment, if at least one of medium busy and idle pattern(s) based on preamble detection indicate that 802.11 radio systems are not active, and if at least one of medium busy and idle pattern(s) based on power detection that are collected at the same time indicate activity on the medium, for example, correlated or periodic access, it is concluded that radio systems operate on the medium that are not 802.11-compliant.

If this is the case, it is concluded that the operation on this medium can result in loss of service support, depending on the local service requirements and the sensing radio system does not select the respective channel for operation.

Discovery of 802.11e Radio Systems by Measuring the Medium Idle Statistics

When 802.11/802.11e radio systems operate with high offered traffic, stations transmit often. Frequently, in such a scenario, medium idle durations are mainly determined by the contention-based medium access. Because 802.11 radio systems and 802.11e radio systems interpret the contention-based medium access procedures differently, their corresponding medium idle patterns are different. This difference serves as a means to distinguish between them in a preferred embodiment. By contrast to 802.11e, 802.11 radio systems access the first slot of the contention window (after Distributed Coordination Interframe Space, DIFS) with low probability, and therefore mainly access later slots, especially in scenarios with high offered traffic.

If medium idle pattern(s) indicate a contention-based medium access procedure that is characteristic for 802.11, but not for 802.11e, in a preferred embodiment it is concluded that radio systems operate on the medium that are 802.11-compliant, but not 802.11e-compliant. If this is the case, QoS support is difficult to achieve when operating on this medium, because it is not a Quality of Service BSS (QBSS) that is already operating on the medium.

Discovery of 802.11e Radio Systems by Measuring the Behavior at Target Beacon Transmission Time (TBTT) and/or at Transmission Opportunity Limit (TXOPlimit)

802.11 radio systems and 802.11e radio systems behave differently at a TBTT and at the end of a transmission opportunity: 802.11e radio systems do not transmit across the TBTT, whereas 802.11 radio systems do transmit across the TBTT. In addition, 802.11 radio systems do not use the TXOPlimit Therefore, 802.11 radio systems eventually initiate frame exchanges with durations larger than TXOPlimit In a preferred embodiment, if at least one of the sensed patterns indicate that the medium is busy before a TBTT and across the TBTT and the sensed patterns indicate that frame exchanges have longer durations than TXOPlimit, it is concluded that radio systems operate on the medium that are 802.11-compliant, but not 802.11e-compliant. In this case, in a preferred embodiment, QoS support is cannot be guaranteed on this medium, because it is not a QBSS that is already operating on the medium.

Discovery of Priorities in Contention-based Medium Access

Radio systems, that operate according to the contention-based medium access of 802.11, support access priorities based on different medium access parameters for different priorities. These parameters are here referred to as QoS parameter sets. The information about the applied QoS parameter sets is helpful in estimating in advance the QoS that can be supported when operating on the medium that is already being used by other 802.11 radio systems.

Rather than receiving the detailed information about the QoS parameter sets applied by the 802.11 radio systems that are currently operating on the medium, the applied QoS parameter sets are derived from the sensed patterns, in a preferred embodiment. This is especially the case when radio systems operate with high offered traffic. In such a scenario, in a preferred embodiment, medium idle durations are determined by a contention-based medium access procedure.

In a preferred embodiment, it is concluded that QoS parameter sets form characteristic medium idle patterns and the higher the priority in medium access, the higher the probability for shorter idle durations, in general.

Discovery of Hybrid Coordination Function Controlled Access (HCCA) Usage

If medium idle pattern(s) indicate idle periods with a high priority medium access duration (referred to as Point Coordination Interframe Space (PIFS), in a preferred embodiment, it is concluded that radio systems operate on the medium that are 802.11e-compliant and that apply the contention-free medium access, e.g., polling as part of HCCA. If this is the case, in a preferred embodiment, it is concluded not to apply contention-free medium access of the HCCA when operating on the medium, because there is already at least one other radio system applying this medium access. That is, in a preferred embodiment, whenever it is concluded that there is at least one other radio system applying HCCA medium access, the system and method of the present invention does not apply contention-free medium access of the HCF, i.e., HCCA.

Discovery of 802.11b/802.11g Radio Systems 802.11b-compliant frames and 802.11g-compliant frames can have different transmission durations, because of different preamble and header durations. There are durations that are characteristic for 802.11g-compliant frames that are typically transmitted by 802.11g radio systems in times when 802.11b radio systems do not operate in parallel.

If medium busy pattern(s) indicate busy durations that are typical for 802.11g, in a preferred embodiment, it is concluded that all radio systems operating on the medium are 802.11g-complaint. If this is the case, in a preferred embodiment, it is concluded that 802.11g radio systems that operate on this medium achieve higher throughput, compared to scenarios where the medium is shared among 802.11b and 802.11g radio systems.

Discovery of a Hidden Station

Data frames and Acknowledgement f(ACK) frames are transmitted consecutively, in nearly all cases when 802.11 radio systems operate. It can be determined if a frame is a data frame or an ACK frame by decoding the frame, or based on the frame duration (indicated by the medium busy duration while sensing the medium, and/or the duration of the preceding idle duration).

If data frames are discovered, but often without the following expected ACK, and if at the same time the virtual carrier sensing (the Network Allocation Vector NAV)) indicates that the transmitting radio station expected an ACK frame, in a preferred embodiment, it is concluded that at least one station is hidden with respect to the sensing station. The additional NAV indicator provides the hidden station discovery with higher accuracy, as it enables it to work even if the Block-ACK policy is applied. The Block-ACK policy is a concept in 802.11e that allows the transmission of data frames without individual ACK frames, i.e., with a block ACK.

Further, in a preferred embodiment, if the sensing station receives frames in a way such that the Extended IFS (EIFS) has to be used by that station, it is concluded that one or more stations are hidden with respect to the sensing station. EIFS has to be used by a station if a preamble and the header of a frame were successfully detected but an error occurred at the end of the frame reception. In a preferred embodiment, it is concluded that another radio station initiated a transmission during the ongoing reception, which can only occur if two stations are hidden with respect to each other.

Further, in a preferred embodiment, if the received power changes during an ongoing transmission, it is concluded that at least one station is hidden with respect to the sensing station.

Medium Sensing Measurement Request 320 and Report 420

In a preferred embodiment, a Medium Sensing Measurement Request 320 (FIGS. 3A-D) and Medium Sensing Measurement Report 420 (FIGS. 4A-D) are used for collecting information about medium access patterns using at least one indicator selected from the group consisting of Received Power Indicator (RPI), Clear Channel Assessment (CCA), and Network Allocation Vector (NAV) coverage.

In a preferred embodiment, the patterns are reported as time histograms, i. e., sets of values that represent the probability of occurrence ("densities") of at least one of some busy and idle durations. Instead of providing histograms over different power levels, in a preferred embodiment, time histograms provide information about busy and idle durations with a precision as defined in the Medium Sensing Measurement Request. For example, ,if a medium sensing time histogram with a slot precision is collected, information about the medium activities of other 802.11 STAs can be derived from the collected information. The time histograms provide details about activities of other radio systems on a channel. This measurement allows improved radio resource management in an 802.11 WLAN.

One advantage of a Medium Sensing Time Histogram is that information about ongoing activities of other radio devices can be collected without receiving probe responses or beacons from other APs during a measurement period. This is helpful when the measuring STA can only receive frames from non-AP STAs, for example, in the case of partially overlapping (Q)BSSs. In a preferred embodiment, once the sensing result information is collected, radio resource management is facilitated by addressing the following questions:

1. Are there other non-802.11 devices, for example, microwave, operating on the channel and what is their medium access pattern (answer most likely to be provided through RPI and CCA time histogram)?
2. Are there legacy 802.11 devices operating on the channel, which would impede the support of QoS (answer may be provided through CCA idle time histogram)?
3. What is the current status in the channel in terms of applied Enhanced Distributed Coordination Function (EDCF) parameters and offered traffic for each priority (answer may be provided through CCA idle time histogram)?
4. Is enough capacity left in the channel for sharing it with the 802.11 devices that are already operating on the channel (answer most likely to be provided through RPI and CCA idle time histogram)?
5. Is it feasible to operate with the contention-free channel access of the HCF on this channel, or is there already another device operating with contention-free channel access (answer provided through CCA idle time histogram)?
6. What is the maximum duration of busy periods, i.e., what is the minimum TXOPlimit applicable on this channel (answer provided through CCA busy time histogram)?

Measurement Request element

Figure 3A:
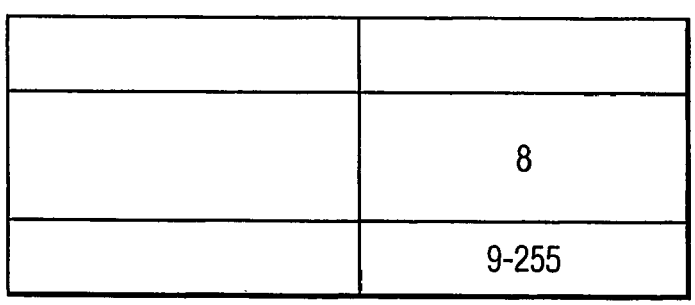
FIG. 3A illustrates Measurement Type definitions for a Measurement Request Element according to an embodiment of the present invention.

FIG. 3A illustrates the defined measurement types for a measurement request element.

Medium Sensing Time Histogram Request 320

Figure 3B:
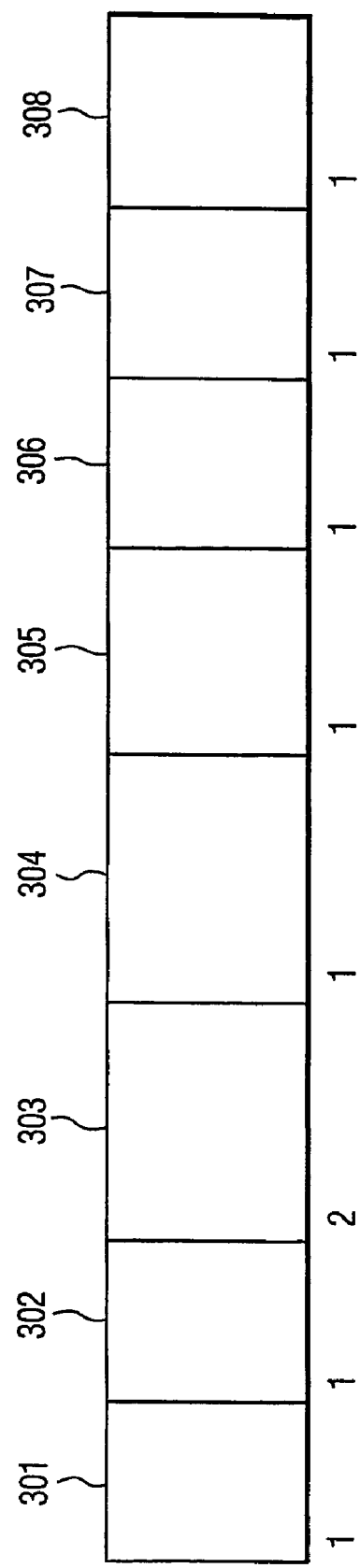
FIG. 3B illustrates Measurement Request field format for a Medium Sensing Time Histogram Request according to an embodiment of the present invention.

The format of the Measurement Request frame corresponding to a Medium Sensing Time Histogram Request 320 is shown in FIG. 3B.

The Channel Number 301 indicates the channel number for which the measurement request applies (as defined, e.g., in IEEE 802.11 17.3.8.3.2);

The Channel Band 302 indicates the frequency band, see FIG. 3D, in which the Channel Number applies;

The Measurement Duration 303 IS set equal to the duration of the requested measurement, expressed in Timer Units (TUs);

The Medium Sensing Measurement Subtype 304 indicates the subtype of Medium Sensing Measurement to make. The available subtypes of Medium Sensing Measurement are defined in FIG. 3E;

The Received Power Indicator (RPI) 305 is defined as a quantized measure of the received power level as seen at the antenna connector;

The Bin Offset 306 indicates the position of the first bin, expressed in microseconds;

The Bin Interval 307 indicates the time interval during which Medium Sensing Events are counted to be in this bin, expressed in slot times. Medium Sensing Events are defined in FIG. 4C.

The Number of Bins 308 indicates the total number of time intervals that are covered by the time histogram.

Medium Sensing Time Histogram Report 420

Figure 4A:
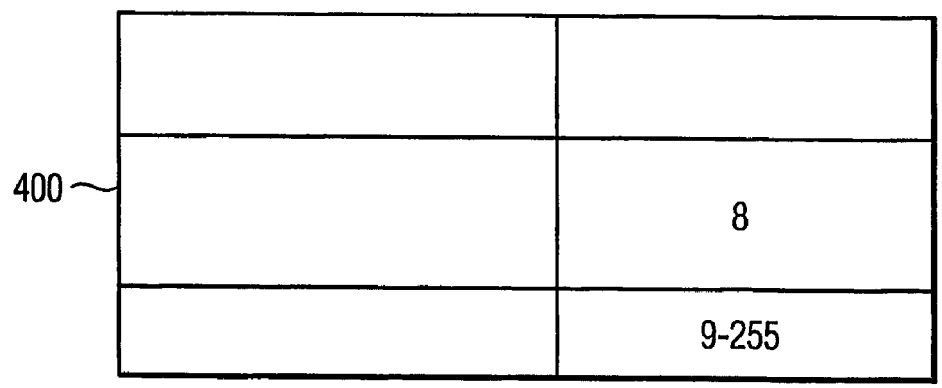
FIG. 4A illustrates a Measurement Type definition for a Medium Sensing Time Histogram Request element according to an embodiment of the present invention.
Figure 4B:
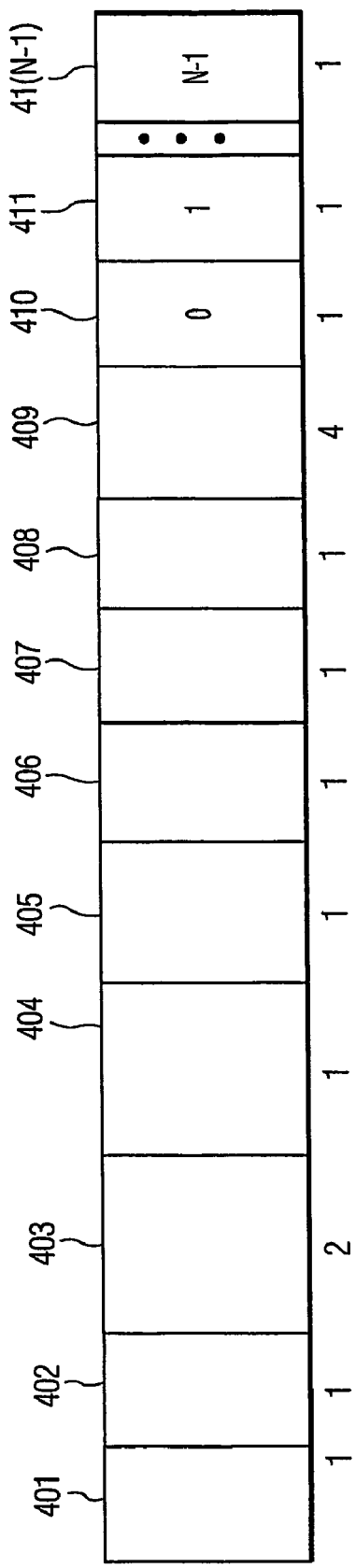
FIG. 4B illustrates a Measurement Report field format for a Medium Sensing Time Histogram Report Element according to an embodiment of the present invention.

The format of the Measurement Report field of a Medium Sensing Time Histogram Report 420 is shown in FIG. 4A.

The Channel Number 401 indicates the channel number to which the Medium Sensing Time Histogram Report applies.

The Channel Band 402 indicates the measured frequency band, taken from Table 2, in which the Channel Number applies.

The Measurement Duration 403 is set equal to the duration over which the Medium Sensing Time Histogram Report was measured, expressed in TUs.

Figure 3E:
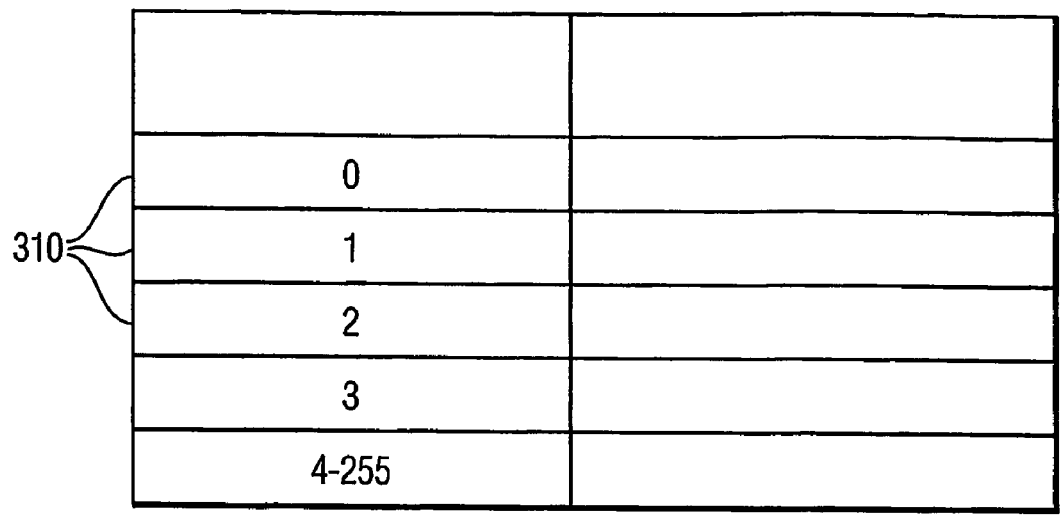
FIG. 3E illustrates Medium Sensing Measurement Subtype definitions for radio measurement requests.

The Medium Sensing Measurement Subtype 404 indicates the subtype of Medium Sensing Time Histogram Report, as defined in FIG. 3E.

The RPI Threshold 405 identifies a received power level threshold according to FIG. 4D, as seen at the antenna connector. The RPI Threshold is used to determine if a Medium Sensing Event occurs, while collecting information for the RPI Time Histogram, The Bin Interval 407 indicates the time interval during which Medium Sensing Events are counted to be in this bin, expressed in slot times. Medium Sensing Events are defined in FIG. 4C.

Number of Bins 408: in one of N bins the Medium Sensing Time Histogram Report contains the densities in each of the N time intervals as measured in the specified channel over the measurement duration.

The Total Number of Medium Sensing Events 409 indicates how many events have been counted during the measurement. The Medium Sensing Events are defined in FIG. 4C.

$Bin_i$ - to compute the $Bin_i$ density, $0 \leq i < N$, the STA monitors the contiguous duration of the monitored state and increments a counter, $B_i$. If a Medium Sensing Event occurs during the measurement at time t with $i_0+(i*\Delta i) < t \leq i_0+((i+1)*\Delta i)$ for any $i < N-1$, $i_0+(N*\Delta i) \leq t$ for $i=N-1$, then the number of events per $B_i$ is increased by one and a probability distribution is developed and a histogram is generated and stored in $Bin_i$; that represents the probability distribution of Medium Sensing Events in time.

In a preferred embodiment, a STA receiving one or more Medium Sensing Time Histogram Requests responds with a Medium Sensing Time Histogram Report containing the histogram(s) according to the requested Medium Sensing Measurement Subtype(s). To provide information that allows assessment of the confidence level of the reported data, the total number of counted Medium Sensing Events is also provided.

As main benefit of the Medium Sensing Time Histogram, information about ongoing activities of other radio devices is collected without receiving probe responses or beacons from other APs during the measurement period. This is helpful when the measuring STA can only receive frames from non-AP STAs, for example, in the case of partially overlapping (Q)BSSs.

1. First, by analyzing Medium Sensing Time Histograms, in a preferred embodiment it is determined if other non-802.11 radio devices operate on the scanned channel and how their medium access is distributed over time. This information is used, for example, to detect microwave devices.

2. Second, by analyzing a Medium Sensing Time Histogram, in a preferred embodiment it is determined if there are 802.11 STAs operating on the channel that do not support QoS as defined by 802.11e. For example, a comparison of the NAV pattern with the TXOPlimit also indicates whether there are legacy 802.11 STAs operating on the channel.

3. Third, by analyzing a Medium Sensing Time Histogram, in a preferred embodiment it is determined if contention free access is used on the channel. A CCA idle histogram is used, for example, to provide this information.

4. Last, by analyzing a reported Medium Sensing Time Histogram, in a preferred embodiment it is determined what level of QoS support is feasible when operating on the scanned channel. For example, it is possible to collect the information about used EDCF parameters on the scanned channel, and the offered traffic on the scanned channels. A CCA idle histogram is used to provide information about traffic load for different priorities with different Arbitration Inter Frame Spaces (AIFS) parameters. It is determined if there is enough capacity left in the scanned channel for sharing the radio resources, under QoS constraints. By analyzing a reported Medium Sensing Time Histogram, it can be further determined what the maximum duration of busy times is and what the minimum TXOPlimit is applicable when operating on the scanned channel.

While the preferred embodiments of the present invention have been illustrated and described, it will be understood by those skilled in the art that various changes and modifications may be made, and equivalents may be substituted for elements thereof without departing from the true scope of the present invention In addition, many modifications may be made to adapt to a particular situation and the teaching of the present invention without departing from its central scope. Therefore it is intended that the present invention not be limited to the particular embodiment disclosed as the best mode contemplated for carrying out the present invention, but that the present invention include all embodiments falling within the scope of the appended claims.

[1] IEEE 802.11 WG Reference number ISO/IEC 8802-11: 1999(E) IEEE Std 802.11, 1999 edition. International Standard [for] Information Technology-Telecommunications and information exchange between systems-Local and metropolitan area networks-Specific Requirements- Part 11: Wireless LAN Medium Access Control (MAC) and Physical Layer (PHY) specifications. New York USA: The Institute of Electrical and Electronics Engineers, Inc. 1999.

[2] IEEE 802.11 WG IEEE Std 802.11a, 1999 edition. Supplement to IEEE Standard for Information Technology - Telecommunications and information exchange between systems - Local and metropolitan area networks-Specific Requirements - Part 11: Wireless LAN Medium Access Control (MAC) and Physical Layer (PHY) specifications: High-speed Physical Layer in the 5 GHz Band. New York USA: The Institute of Electrical and Electronics Engineers, Inc. 1999.

[3] IEEE 802.11 WG IEEE Std 802.11b, 1999 edition. Supplement to IEEE Standard for Information Technology-Telecommunications and information exchange between systems-Local and metropolitan area networks- Specific Requirements- Part 11: Wireless LAN Medium Access Control (MAC) and Physical Layer (PHY) specifications: Higher-Speed Physical Layer Extension in the 2.4 GHz Band. New York USA: The Institute of Electrical and Electronics Engineers, Inc. 1999.

What is claimed is:

1. A method for deriving information about a second station that operates on a medium scanned by a first station, comprising:

scanning by the first station during a predetermined sensing interval for an activity on the medium carried out by the second station;

measuring by the first station the activity of the second station; and deriving by the first station an activity pattern of the second station over the predetermined sensing interval based on the activity of the second station, wherein scanning by the first station includes:

detecting a busy period and an idle period during the predetermined sensing interval;

accumulating a received power level of the activity;

sensing the busy period when the received power level exceeds a predetermined power threshold and a preamble is detected; and sensing the idle period when the received power level does not exceed than the predetermined power threshold and the preamble is not detected.

2. The method of claim 1, further comprising detecting a virtual busy period.

3. The method of claim 2, further comprising sensing a detected virtual busy period as an allocated medium by the second station that is not used for transmission by the second station.

4. The method of claim 3, further comprising ascertaining an absolute number of occurrences and a total duration of the activity over the sensing interval.

5. The method of claim 4, further comprising computing from the total duration of the activity a percentage of time the activity occurred during the sensing interval.

6. The method of claim 1, further comprising using the derived activity pattern to discover at least one of
- the second station being a non-IEE 802.11 device,
- the second station being an IEE 802.11e device,
- the quality of service (QoS) parameter set being applied by the second station,
- the second station using a hybrid coordination function (HCF),
- the second station being one of IEE 802.11b and IEE 802.11g, and
- the second station being hidden from the first station.

7. The method of claim 6, further comprising
- receiving a Medium Sensing Measurement Request by the first station for the derivation of at least one medium access pattern of the second station; and
- in response to the received Medium Sensing Measurement Request, transmitting by the first station a Medium Sensing Measurement Report containing at least one medium access activity pattern of the second station derived by the first station.

8. A method for obtaining information about medium activity patterns of a second station on a medium scanned by a first station, comprising:
- transmitting by the first station a Medium Sensing Measurement Request;
- receiving, by the first station in response to the transmitted request, a Medium Sensing Measurement Report comprising an activity pattern of the second station;
- using by the first station the activity pattern of the second station to discover at least one of
  i. the second station being a non-IEE 802.11 device,
  ii. the second station being an IEE 802.11e device,
  iii. the quality of service (QoS) parameter set being applied by the second station,
  iv. the second station using a hybrid coordination function (HCF),
  v. the second station being one of IEE 802.11b and IEE 802.11g, and
  vi. the second station being hidden from the first station.

9. An apparatus at a first station for obtaining information about a second station that operates on a medium scanned by the first station, comprising:
- a receiver for receiving an incoming signal from the second station over a predetermined sensing interval;
- an activity acquisition and pattern derivation circuit that measures activity patterns of said incoming signal and derives patterns;
- a timer that provides a time reference in timer units (TUs); and
- a control processor, coupled to said activity acquisition and pattern derivation circuit and said timer, configured to sense a busy and an idle activity of said incoming signal and derive an activity pattern as a histogram over time, wherein the control processor is configured to:
- detect a busy period and an idle period during the predetermined sensing interval;
- accumulate a received power level of the activity;
- sense the busy period when the received power level exceeds a predetermined power threshold and a preamble is detected; and
- sense the idle period when the received power level does not exceed than the predetermined power threshold and the preamble is not detected.

10. The apparatus of claim 9, wherein said control processor is further configured to sense a detected virtual busy period as an allocated medium by the second station that is not used for transmission by the second station, regardless of the accumulated received power level.

11. The apparatus of claim 10, wherein said control processor is further configured to use the derived activity pattern to discover at least one of
- the second station being a non-IEE 802.11 device,
- the second station being an IEE 802.11e device,
- the quality of service (QoS) parameter set being applied by the second station,
- the second station using a hybrid coordination function (HCF),
- the second station being one of IEE 802.11b and IEE 802.11g, and
- the second station being hidden from the first station.

12. The apparatus of claim 11, wherein:
- the first station receives a Medium Sensing Measurement Request for the derivation of at least one medium access histogram of the second station; and
- in response to the received Medium Sensing Measurement Request, the first station transmits a Medium Sensing Measurement Report containing at least one medium access histogram of the second station derived by the first station.

* * * * *